United States Patent [19]

David et al.

[11] Patent Number: 4,550,122
[45] Date of Patent: Oct. 29, 1985

[54] ATTACHMENT FOR REMOVING RESIDUE IN FRONT OF A PLANTER

[75] Inventors: John C. David; Ward E. Ryon, both of Columbus, Nebr.

[73] Assignee: Fleischer Manufacturing, Inc., Columbus, Nebr.

[21] Appl. No.: 514,888

[22] Filed: Jul. 18, 1983

[51] Int. Cl.[4] .............................................. A01C 5/06
[52] U.S. Cl. .................................. 172/158; 172/574; 172/504; 172/430; 111/88
[58] Field of Search ..................... 172/154, 158, 624.5, 172/574, 504, 430; 111/85, 88

[56] References Cited

U.S. PATENT DOCUMENTS

| 736,369 | 8/1903 | Dynes | 172/574 |
|---|---|---|---|
| 901,145 | 10/1908 | Bateman | 172/154 |
| 1,259,826 | 3/1918 | Bloom | 111/85 |
| 1,421,109 | 6/1922 | Thomson | 172/158 X |
| 1,480,161 | 1/1924 | Ford | 172/574 |
| 2,341,143 | 2/1944 | Herr | 172/518 |
| 3,093,196 | 6/1963 | Nakatani | 111/88 |
| 3,499,495 | 3/1970 | Pust | 111/88 |
| 3,797,418 | 3/1974 | Bridges | 111/73 |
| 4,295,532 | 10/1981 | Williams | 172/574 |
| 4,377,979 | 3/1983 | Peterson | 172/624.5 |

FOREIGN PATENT DOCUMENTS 206992 11/1956 Australia ............................ 111/88

OTHER PUBLICATIONS

"Buffalo All-Flex ® Till Planter", Brochure.

Primary Examiner—Richard J. Johnson
Attorney, Agent, or Firm—Henderson & Sturm

[57] ABSTRACT

An attachment for a minimum tillage planter which is mounted forwardly of the planting shoe for removing residue from in front of such planting apparatus for the purpose of allowing consistency in the making of a trench and for the depositing of seeds therein in a consistent manner. The attachment generally includes a first center flat disc having a circular structure attached thereto for controlling the depth at which the planter rides above the ground. A pair of additional discs are mounted on each side of the depth control structure and on each side of the center flat disc. These additional discs are convex on the side adjacent to the first disc and concave on the other side thereof. The position of the additional discs are such that they do not extend into the ground as far as the first disc whereby the first disc will hold residue, such as a corn stalk, while the other discs which are higher will cut the residue off and then throw it to one side or the other.

8 Claims, 7 Drawing Figures

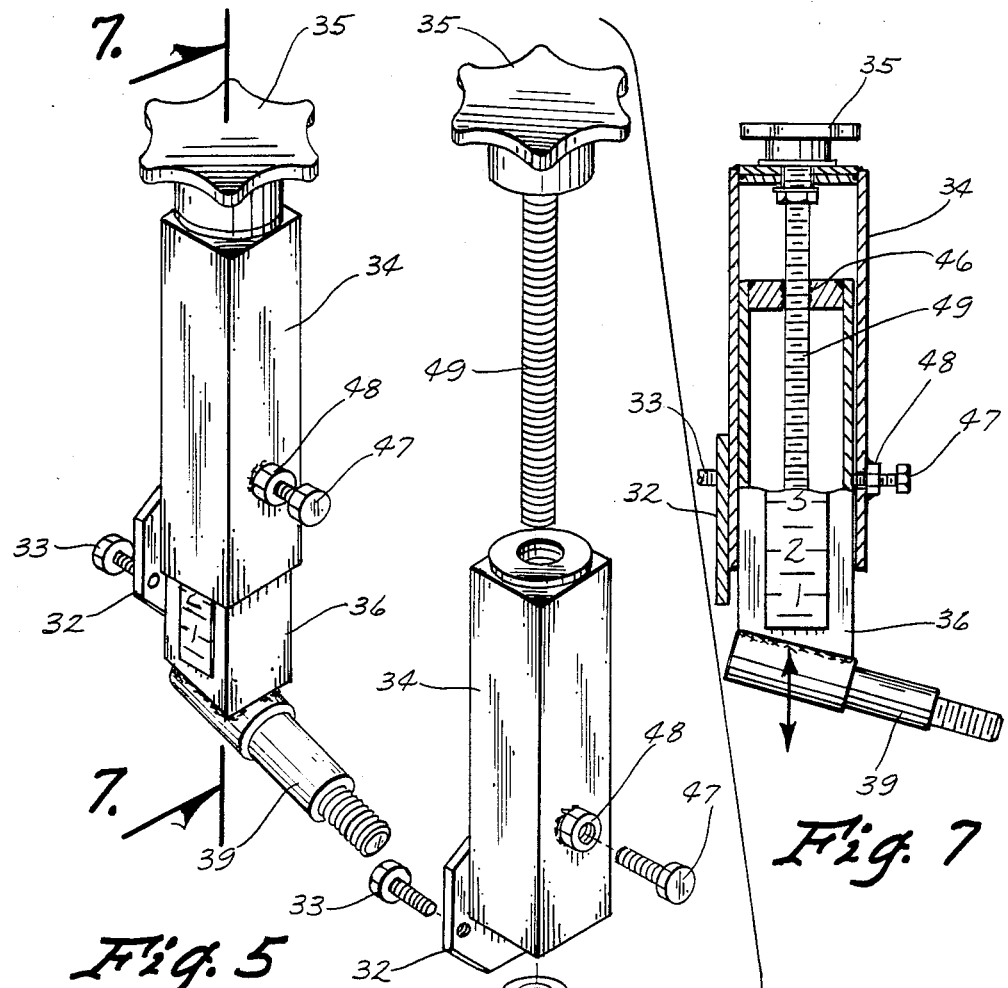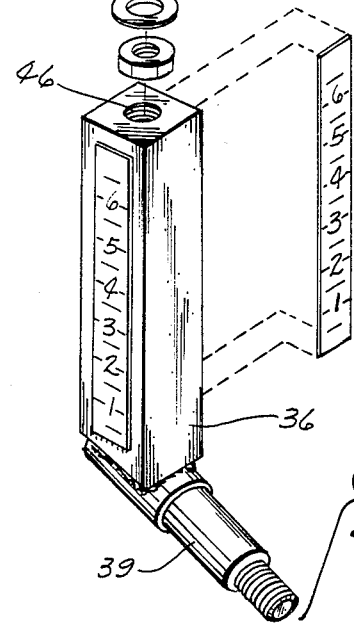

ATTACHMENT FOR REMOVING RESIDUE IN FRONT OF A PLANTER

TECHNICAL FIELD

The present invention relates generally to agricultural planters and more particularly to minimum tillage type planters.

BACKGROUND ART

It is well-known that in order to grow crops it is desirable to first prepare a seed bed. For example, it is generally believed to be desirable to break-up the soil into fine particles, remove all growing weeds, insure that there is not undue compaction of the soil, and to remove or chop up the residue from the previous years crops. Because of this conventional knowledge, it has been customary to prepare the seed bed in various ways which may include plowing, disking, harrowing and many other combinations of operations in order to prepare a seed bed so that a planting apparatus can be used to actually plant the seeds into the ground.

Due in large part to the increases in labor, fuel and machinery costs, there has been a trend moving away from having several operations over the field to reducing the number of passes over the field to an absolute minimum. To this end, many minimum tillage planters have been developed, and one of the most commercially successful of these planters is shown in U.S. Pat. No. 3,491,709 to Fleischer.

Besides the advantage of conserving fuel costs and labor, there are many other advantages to minimum tillage operations. For example, when crop residues are left on top of the ground, rather than turning them under with a plow or the like, organic matter breaks down much more rapidly into beneficial soil components. In addition, the residue helps prevent wind and water erosion and reduce moisture loss from the soil due to evaporation. As an added benefit, the residue between the rows keeps the soil cooler. Since the weed seeds are between the rows, it means a slower start for weeds.

The conventional tillage ideas of working the soil many times accomplishes many unnecessary results. For example, it takes the weed seeds from the top of the ground and plants them in the soil. It stirs up the soil so it will dry out faster. It requires more man hours, it increases the cost, it compacts the soil. It requires more fuel and sooner equipment repair and maintenance needs. Furthermore, tests have proven that yields are not affected by the amount of working the soil gets. Also, it has been determined that the natural weathering processes of freezing and thawing, wetting and drying, are constantly at work during the winter and spring to prevent soil compaction, so it is not as necessary as it was once thought to be to turn the soil over.

One of the common problems with minimum tillage planting devices is that the residue left over from the previous years crop often interfers with the planting operation. Numerous devices have been devised for the purpose of trying to get this residue out of the way in front of the part of the planting shoe which essentially digs a trench for permitting seeds to be dropped therein. If a consistent trench cannot be made or if the trench has residue from the previous years crop therein, then the planting operation also becomes inconsistent; and consistent, even planting of the seeds is necessary for a maximum yield.

In particular, long corn stalks have been a problem in the past because they interfer with the making of a consistent trench for the seeds to be dropped into. For that reason, some times a chopper is used prior to the planting operation. If this chopping operation can be avoided, labor and fuel costs will be decreased. The devices in front of conventional minimum tillage planters have heretofore not completely solved the problem of corn stalks or the like interfering with the planting operation.

DISCLOSURE OF THE INVENTION

The present invention relates to an attachment for a minimum tillage planter which is mounted forwardly of the planting shoe for removing residue from in front of such planting apparatus for the purpose of allowing consistency in the making of a trench and for the depositing of seeds therein in a consistent manner. The invention generally includes a first center flat disc having a circular structure attached thereto for controlling the depth at which the planter rides above the ground. A pair of additional discs are mounted on each side of the depth control structure and on each side of the center flat disc. These additional discs are convex on the side adjacent to the first disc and concave on the other side thereof. The position of the additional discs are such that they do not extend into the ground as far as the first disc whereby the first disc will hold residue, such as a corn stalk, while the other discs which are higher will cut the residue off and then throw it to one side or the other.

An object of the invention is to provide an improved planting apparatus.

Another object of the invention is to provide an attachment for a planter which will remove residue in front of a planting apparatus.

A further object of the invention is to provide an attachment of the type referred to above which will have one part which holds the residue while it is being cut by another part of the apparatus.

Other objects, advantages and novel features of the present invention will be readily appreciated from the following detailed description of the best mode for carrying out the invention.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 5 is a perspective view of a mechanism for adjusting the position of outer discs;

FIG. 6 is an exploded perspective view of the FIG. 5 structure; and

FIG. 7 is a partial cross-sectional view taken along line 7—7 of FIG. 5.

BEST MODE FOR CARRYING OUT THE INVENTION

Figure 1:
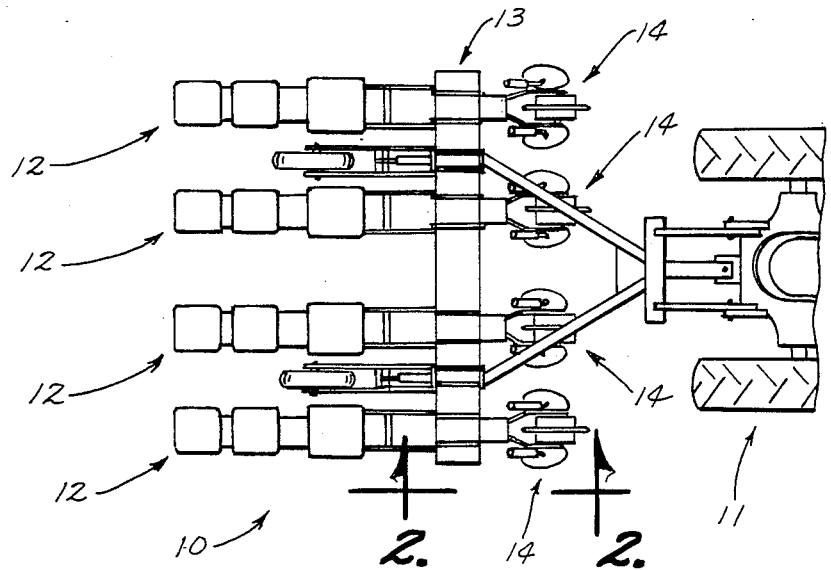
FIG. 1 shows a top plan view of the present invention attached to a planter and the planter to an agricultural tractor.

Referring now to the drawings wherein like reference numerals designate identical or corresponding parts throughout the several views, FIG. 1 shows a planter (10) attached to a tractor (11) for the purpose of being able to pull the planter (10) through a field for planting seeds in the soil. The planter (10) has a plurality of planter units (12) attached to a tool bar (13). It will be readily understood to those skilled in this art that any number of planter units (12) may be attached to the tool bar (13) as desired.

Each of the planter units (12) has a residue removing apparatus (14) attached to the front thereof and the present invention resides in these residue removing devices (14) in combination with a planting apparatus (12).

Figure 2:
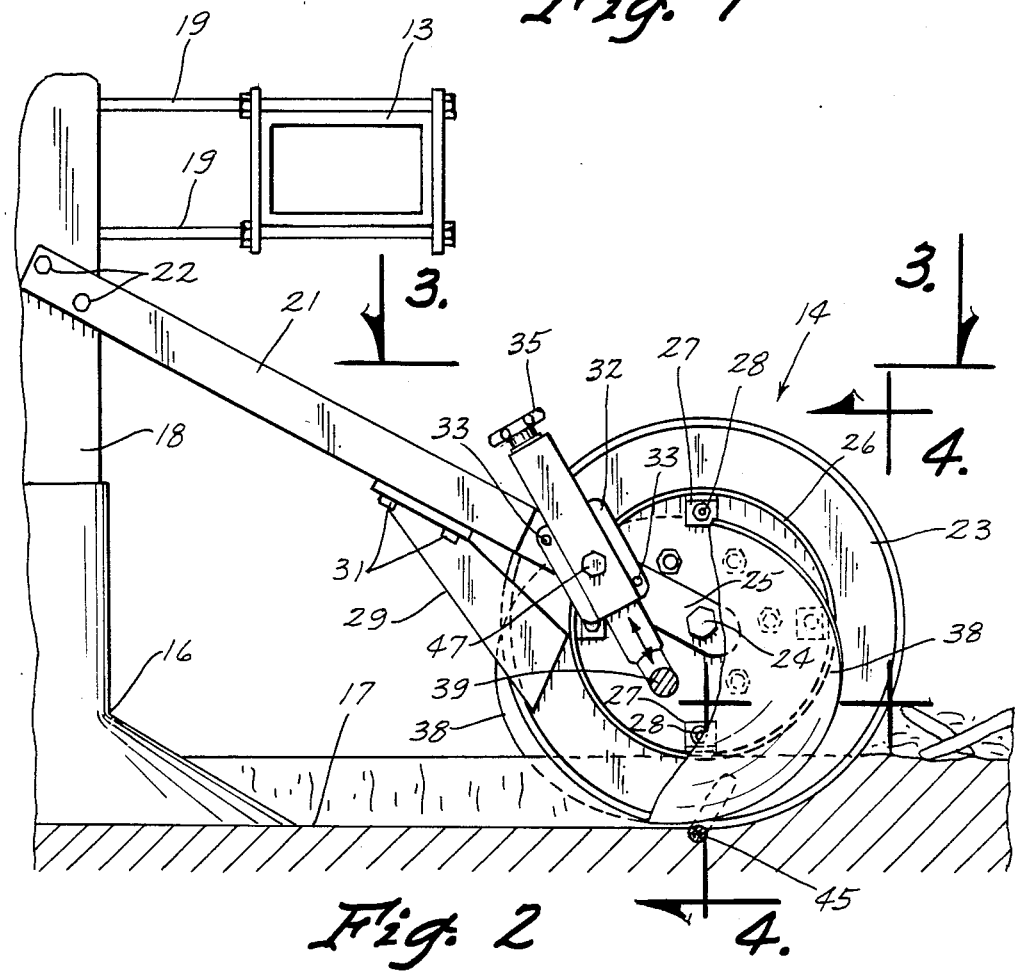
FIG. 2 is an enlarged view of the present invention taken along line 2—2 of FIG. 1.

Referring to FIG. 2, it is noted that a sweep member (16) is provided for cutting off the top of the soil for causing residue and dirt to move around to each side thereof and for the purpose of forming a flat surface (17) over the top of the ground whereby a trench can be formed from the top surface (17) downwardly and for then permitting seeds to be inserted into the trench. On the back side of each of the planter units (12) is a conventional apparatus for closing the trench, thereby finishing the planting operation. A structural member (18), which is connected to the sweep (16) on the lower end thereof and to the tool bar (13) on the upper end thereof by means of bolts (19), also has a cantilevered member (21) attached thereon by means of nut and bolt devices (22).

The cantilevered member (21) has a large flat disc (23) rotatably attached thereto at portion (25) thereof by a pivot bolt (24). The flat disc (23) has a pair of metal bands (26) attached thereto on each side thereof by means of brackets (27) which are welded to the metal bands (26) and bolted to the flat disc (23) by means of nut and bolt fasteners (28).

Disc scrapers (29) are connected by bolts (31) to the cantilevered member (21) and extend in close proximity to the disc (23) for keeping it clean. These disc scrapers (29) may also extend over to keep the soil from building up on the depth bands (26), if so desired.

A bracket (32) is rigidly attached to cantilevered member (21) by means of fasteners (33) and an adjustment housing (34) is rigidly attached to the bracket (32), for example by welding. A handle (35) extends down into the housing (34) and is connected to a threaded bolt (49). This threaded bolt (49) extends into an internally threaded housing member (36) so that when the handle (35) is rotated in one direction, the housing member (36) moves upwardly, for reasons which will be explained below.

Figure 3:
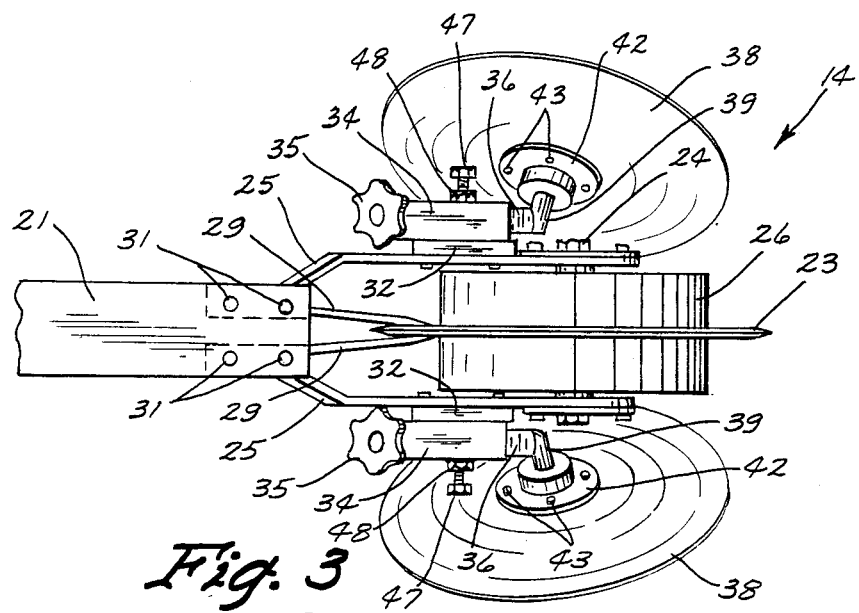
FIG. 3 is a view taken along line 3—3 of FIG. 2.
Figure 4:
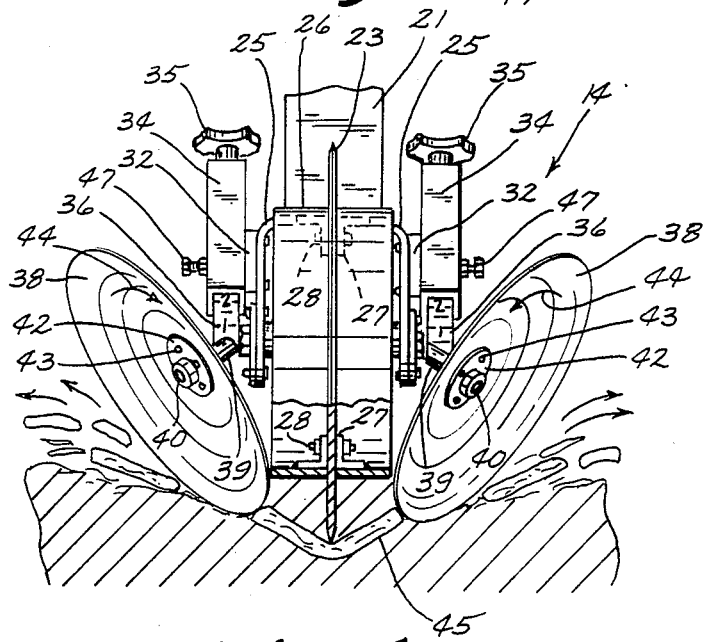
FIG. 4 is a partial cross-sectional view taken along line 4—4 of FIG. 2.

A pair of discs (38) are positioned closely to each side of the flat disc (21) in close proximity to the circular depth control bands (26). These discs (38) are convex on the side adjacent to the disc (23) and concave on the other outward side thereof. These discs (38) are rotatably mounted on axles (39) which are rigidly attached to the bottom of members (36). A nut and washer (40) serve to hold the discs (38) on the axle (39) in a conventional manner on one side thereof, while a bearing structure (42) (see FIG. 3) is attached to the discs (38) by means of fasteners (43) on the inside of each of the discs (38).

In operation, as the tractor (11) pulls the planter (10), the discs (23) will cut through the ground and the depth control bands (26) will control the depth that the individual planting apparatus (12) will extend into the ground. As the planter apparatus (10) is pulled forwardly by the tractor (11), the discs (38) will also be rotating in the direction of the arrows (44) so as to cut through residue, such as the corn stalk (45) which is shown, and throw the cut-off portion of the residue and soil outwardly away from the center flat disc (23). These discs (38) are positioned so that a bottom front portion thereof extends below the depth control band (26) but above the bottom of the flat disc (23) so that one or the other or both of the depth control bands (26) and the flat disc (23) will hold residue while the discs (38) cut the residue off. This is similar to a person cutting a steak by holding it with a fork and then cutting it off with a knife.

The handle (35) may be used to effect the proper setting of disc (38) with respect to the depth control bands (26). If the handles (35) are rotated in one direction, the discs (38) move downwardly and are spaced further away from the depth control bands (26), while rotation in the opposite direction, has an opposite result.

Obviously, many modifications and variations of the present invention are possible in light of the above teachings. It is therefore to be understood that, within the scope of the appended claims, the invention may be practiced otherwise than as specifically described.

We claim:

1. A trash clearing apparatus for a planter of a type including:

a frame adapted to be moved forwardly above the soil;

planting means attached to said frame for depositing seeds in the soil;

trash hold down means for holding trash against the soil in front of said planting means, said trash hold down means being operably rotatably attached to said frame along a first generally horizontal axis, said horizontal axis being substantially perpendicular to the direction of forward travel of said frame, said trash hold down means having a central portion including a generally circular peripheral portion disposed radially outwardly from said horizontal axis, said trash hold down means having a first generally circular radially outer peripheral edge portion spaced from and disposed on one side of said central portion and a second generally circular radially outer peripheral edge portion spaced from and disposed on the other side of said central portion;

a first disc means for cutting trash which is being held down by said trash hold down means, said first disc means being disposed directly to one side of said trash hold down means and operably rotatably attached to said frame along a second axis, said second axis being obliquely disposed with respect to said first horizontal axis, the bottom of said first disc means being substantially directly below the bottom of said first outer peripheral edge portion; and a second disc means for cutting trash which is being held by said trash hold down means, said second disc means being disposed directly on the other side of said trash hold down means, said second disc means being operably rotatably attached to said frame along a third axis obliquely disposed with respect to said horizontal axis, the bottom of said third disc means being substantially directly below the bottom of said second outer peripheral edge portion, whereby trash which might interfere with the planting process is cut up and removed from in front of the planting means;

said first and second disc means being convex on the side adjacent to said trash hold down means and concave on the other side thereof, and wherein said second and third axes extend forwardly, outwardly and downwardly from said trash hold down means whereby said first and second disc means will throw trash and soil outwardly away from said trash hold down means.

2. A trash clearing apparatus for a planter of a type including:

a frame adapted to be moved forwardly above the soil;

planting means attached to said frame for depositing seeds in the soil;

trash hold down means for holding trash against the soil in front of said planting means, said trash hold down means being operably rotatably attached to said frame along a first generally horizontal axis, said horizontal axis being substantially perpendicular to the direction of forward travel of said frame, said trash hold down means having a central portion including a generally circular peripheral portion disposed radially outwardly from said horizontal axis, said trash hold down means having a first generally circular radially outer peripheral edge portion spaced from and disposed on one side of said central portion and a second generally circular radially outer peripheral edge portion spaced from and disposed on the other side of said central portion;

a first disc means for cutting trash which is being held down by said trash hold down means, said first disc means being disposed directly to one side of said trash hold down means and operably rotatably attached to said frame along a second axis, said second axis being obliquely disposed with respect to said first horizontal axis, the bottom of said first disc means being substantially directly below the bottom of said first outer peripheral edge portion; and a second disc means for cutting trash which is being held by said trash hold down means, said second disc means being disposed directly on the other side of said trash hold down means, said second disc means being operably rotatably attached to said frame along a third axis obliquely disposed with respect to said horizontal axis, the bottom of said third disc means being substantially directly below the bottom of said second outer peripheral edge portion, whereby trash which might interfere with the planting process is cut up and removed from in front of the planting means;

means for adjusting the position of said second and third axes and thereby said first and second disc means with respect to the trash hold down means for thereby adjusting the depth that said first and second disc means extend into the ground, said adjusting means including a threaded rod having a handle thereon for each of said first and second disc means wherein rotation of one of said handles in one direction causes the respective disc means to move upwardly and rotation of said handle in an opposite direction causes said respective disc means to move downwardly.

3. A trash clearing apparatus for a planter of a type including:

a frame adapted to be moved forwardly above the soil;

planting means attached to said frame for depositing seeds in the soil;

trash hold down means for holding trash against the soil in front of said planting means, said trash hold down means being operably rotatably attached to said frame along a first generally horizontal axis, said horizontal axis being substantially perpendicular to the direction of forward travel of said frame, said trash hold down means having a central portion including a generally circular peripheral portion disposed radially outwardly from said horizontal axis, said trash hold down means having a first generally circular radially outer peripheral edge portion spaced from and disposed on one side of said central portion and a second generally circular radially outer peripheral edge portion spaced from and disposed on the other side of said central portion;

said trash hold down means comprising a coulter disc having circular bands rigidly connected to each side thereof, the diameter of said circular bands being less than the diameter of said coulter disc whereby said coulter disc extends into the ground and said circular bands roll along the top of the ground;

a first disc means for cutting trash which is being held down by said trash hold down means, said first disc means being disposed directly to one side of said trash hold down means and operably rotatably attached to said frame along a second axis, said second axis being obliquely disposed with respect to said first horizontal axis, the bottom of said first disc means being substantially directly below the bottom of said first outer peripheral edge portion; and a second disc means for cutting trash which is being held by said trash hold down means, said second disc means being disposed directly on the other side of said trash hold down means, said second disc means being operably rotatably attached to said frame along a third axis obliquely disposed with respect to said horizontal axis, the bottom of said third disc means being substantially directly below the bottom of said second outer peripheral edge portion, whereby trash which might interfere with the planting process is cut up and removed from in front of the planting means.

4. The apparatus of claim 3 wherein said circular bands comprise means for controlling the depth that said coulter disc extends into the ground.

5. The apparatus of claim 3 wherein said first and second disc means are convex on the side adjacent to said trash hold down means and concave on the other side thereof.

6. The apparatus of claim 3 wherein said coulter disc is generally flat in shape.

7. The apparatus of claim 3 including means for adjusting the position of said second and third axes and thereby said first and second disc means with respect to the trash hold down means for adjusting the depth that said first and second disc means extend into the ground.

8. A trash clearing apparatus for a planter of a type including:
- a frame adapted to be moved forwardly above the soil;
- planting means attached to said frame for depositing seeds in the soil;
- trash hold down means for holding trash against the soil in front of said planting means, said trash hold down means being operably rotatably attached to said frame along a generally horizontal axis, said horizontal axis being substantially perpendicular to the direction of forward travel of said frame, said trash hold down means having a central portion including a generally circular peripheral coulter disc radially outwardly from said horizontal axis, said coulter disc having an extreme bottom portion;
- a first disc means for cutting trash which is being held down by said trash hold down means, said first disc means being disposed directly to one side of said trash hold down means whereby said horizontal axis extends through said first disc means, said first disc means being operably rotatably attached to said frame along a second axis, said second axis being obliquely downwardly and outwardly disposed with respect to said first horizontal axis, the bottom of said first disc means being above the extreme bottom portion of said coulter disc; and
- a second disc means for cutting trash which is being held by said trash hold down means, said second disc means being disposed directly on the other side of said trash hold down means, whereby said horizontal axis extends through said second disc means, said second disc means being operably rotatably attached to said frame along a third axis obliquely downwardly and outwardly disposed with respect to said horizontal axis, the bottom of said second disc means being above the extreme bottom portion of said coulter disc, whereby trash which might interfere with the planting process is cut up and removed from in front of the planting means.

* * * * *